United States Patent [19]

Jones, Jr.

[11] Patent Number: 5,518,540
[45] Date of Patent: May 21, 1996

[54] CEMENT TREATED WITH HIGH-PRESSURE $CO_2$

[75] Inventor: Roger H. Jones, Jr., Reno, Nev.

[73] Assignee: Materials Technology, Limited, Reno, Nev.

[21] Appl. No.: 483,235

[22] Filed: Jun. 7, 1995

[51] Int. Cl.6 ................................................. C04B 40/00
[52] U.S. Cl. ........................ 106/638; 106/713; 106/738; 106/740; 264/61; 264/104; 264/333; 264/DIG. 43
[58] Field of Search .................................. 106/738, 739, 106/742, 743, 752, 820, 740, 638, 748, 713; 264/DIG. 43, 333, 82, 104, 61; 252/500, 503

[56] References Cited

U.S. PATENT DOCUMENTS

| | | | |
|---|---|---|---|
| 4,069,063 | 1/1978 | Ball | 106/713 |
| 5,307,876 | 5/1994 | Cowan et al. | 106/790 |
| 5,358,676 | 10/1994 | Jennings et al. | 264/104 |

OTHER PUBLICATIONS

Japan Patent Abstract —"Production of High Strength Cured Cement Material Utilizing Carbonation reaction" Suzuki et al. JP 06–263562 (Sep. 20, 1994).

Japan Patent Abstract —"Production of High oil Resistant Cement Hardend Body" Suzuki et al. JP 06–10749 (Apr. 19, 1994).

*Primary Examiner*—Paul Marcantoni
*Attorney, Agent, or Firm*—Townsend and Townsend and Crew

[57] ABSTRACT

Cured cement matrices are exposed to dense-phase or supercritical $CO_2$ which enters the matrix through passages therein to neutralize the natural alkalinity of the cement so that alkali-intolerant materials can be incorporated in the cement. The $CO_2$ converts calcium hydroxide in the cement to calcium carbonate and water, and the high pressure of the dense-phase or supercritical $CO_2$ forms rounded, closely packed and aligned crystals with few or no visible pores or capillaries to enhance the homogeneity and strength of the cured cement and its bonding with, for example, uncoated reinforcing glass fibers. The supercritical $CO_2$ can be used to transport other organic or inorganic materials, including pulverized metal, in solution or suspension into the interior of the cement matrix to alter its chemical and/or physical characteristics. The supercritical $CO_2$ can further be used to quickly determine if a particular cement specimen comes from a wet cement mix to which a material has been added which prevents or hinders cement carbonation.

20 Claims, No Drawings

CEMENT TREATED WITH HIGH-PRESSURE CO₂

BACKGROUND OF THE INVENTION

This invention relates to improving characteristics of cement by subjecting it to dense-phase gaseous (very high pressure) or supercritical (fluid) carbon dioxide ($CO_2$) to alter the morphology and/or chemistry of hardened portland, lime or pozzolanic cement paste and permit manipulation of its properties and behavior. The invention further relates to testing cement to determine the extent to which additives in the cement may resist the carbonation of the cement.

As disclosed in my copending, commonly owned U.S. patent application (Ser. No. 08/390,468, filed Jan. 27, 1995, for Cement Mixtures With Alkali-Intolerant Matter and Method of Making Same), the disclosure of which is incorporated herein and made part hereof by reference, cement carbonation may be used to neutralize alkalinity to permit incorporation of alkali-intolerant materials into the wet paste to make superior products. That application discloses to expose cement to low-pressure carbon dioxide.

Cement carbonation, wherein naturally-occurring carbon dioxide in the atmosphere gradually combines with the calcium hydroxide in the cement matrix to form calcium carbonate and water, is generally considered undesirable because concrete containing steel reinforcement relies upon high alkalinity to inhibit steel corrosion. As carbonation takes place over time, alkali is reduced and the prophylaxis the steel receives against corrosion is lessened. Eventually, the steel begins to corrode, thereby weakening the concrete. The stoichiometry of the carbonation reaction is:

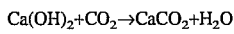

$$Ca(OH)_2 + CO_2 \rightarrow CaCO_3 + H_2O$$

In contrast, deliberate carbonation to purposely reduce hydroxide using gaseous $CO_2$, as is disclosed in my above-referenced patent application, quickly and completely eliminates the alkalinity in hardened cement pastes, whether the paste is acting alone or as part of other materials such as concretes or composites. The only morphological change that is visibly apparent under scanning electron microscope (SEM) examination is the absence of ettringite and portlandite and the appearance of visible micro-crystals of calcite (often called "dog teeth") in what prior to carbonation was calcium-silicate-hydrate gel. Some change is noted in the micromorphology, but pores and capillaries are still discernible and relatively plentiful. I have discovered that a much greater visible change takes place when dense-phase or supercritical carbon dioxide is infused. The diversity of structures is reduced and a regular "rice-grain" morphology is now evident. Another change that is clearly apparent in both cases using powder X-ray diffraction (XRD) is that the portlandite and ettringite peaks are absent in the spectrographic signature. They have been replaced by a very strong calcite peak. An identical chemical change can be observed in powder XRD of cement pastes carbonated by means of supercritical $CO_2$.

As noted above, during experimentation it was discovered that when a cement matrix is exposed to carbon dioxide in its supercritical state, massive, observable morphological changes occur. The result is a densified, simplified microstructure with fewer different types of crystals, and exhibiting fewer micro-pores and microcapillaries than is typical of cements carbonated by means of relatively low-pressure gaseous $CO_2$ or cements which have not been deliberately carbonated at all. The flat, plate-like structures indicative of portlandite, and the fine, needle-like crystals of ettringite are absent. In their place are rounded, closely packed, siliceous crystals with a "rice grain" appearance, neatly aligned with one another and with few or no visible pores or capillaries.

It was further discovered that supercritical $CO_2$, long recognized as a polar solvent, can, if desired, simultaneously be used to infuse the hardened cement matrix with materials dissolved or suspended in the supercritical $CO_2$ to alter the properties and behavior of the hardened cement. In addition, because certain cement whose original wet mixes contained methyl cellulose polymer as an additive refused to carbonate, even when exposed to the extreme pressures and concentrations of $CO_2$ in its supercritical state, the very process of forcing supercritical carbon dioxide into the matrix enabled one to determine to what extent a cement would ultimately carbonate, if it would do so at all. It also became evident that the methyl cellulose prevented cement carbonation since it was the only material not present in the other mix designs tested.

Finally, it was discovered that other materials with matrices similar to cement, particularly ceramics whose pore structure and density can be easily controlled during formulation and firing, can also be infused with materials transported by the supercritical $CO_2$.

The advantages and results obtained with the present invention as discussed below are attainable with supercritical $CO_2$, as above defined, and dense-phase $CO_2$. Both of them readily flow into and through cement (unless specially treated to close its passages), particularly under the high pressure of supercritical $CO_2$.

$CO_2$ becomes supercritical when it reaches a temperature of at least 31° C. and a pressure of at least 1071 psi. Further, supercritical $CO_2$ retains its supercritical characteristics even if, thereafter, its temperature drops below the supercritical threshold so long as at least the threshold pressure is maintained. Dense-phase $CO_2$ is not supercritical and does not simultaneously behave like a liquid and a gas because it has not reached a temperature of 31° C. and a pressure of 1071 psi. Dense-phase $CO_2$ is highly compressed gas; say of a pressure of 80 to 100 atmospheres or more but which has never reached a temperature of at least 31° C. so that it does not have the characteristics typical of supercritical $CO_2$. For purposes of the present invention, dense-phase $CO_2$ behaves similar to supercritical $CO_2$ with the exception that dense-phase $CO_2$, unlike supercritical $CO_2$, does not dissolve or suspend certain materials soluable or suspendable in supercritical $CO_2$ as is discussed below. Thus, unless otherwise stated, "supercritical $CO_2$" as used herein, including the claims, is intended to and does collectively refer to supercritical $CO_2$ and dense-phase $CO_2$ except in those instances, including the claims, which address the solubility or suspendability of certain materials in supercritical $CO_2$, when the term "supercritical $CO_2$" excludes "dense-phase $CO_2$".

SUMMARY OF THE INVENTION

When a material is used as a reinforcement and/or aggregate in cement mixes made with portland, lime, pozzolanic or other appropriate hydraulic cement, the strength and flexibility contributed by such reinforcement and/or aggregate is in direct proportion to the strength of the bond between it and the cement matrix. To increase compressive or flexural strength, it is therefore necessary to increase the tenacity of the bond. Cement carbonation integrates the aggregate or reinforcing glass, plastic, natural materials or blends or materials into the crystalline lattice of the cement by forming a structurally sound, unimpaired bond between the cement and the reinforcement and/or aggregate. It does this by reducing or eliminating the portlandite in the transition phase surrounding these materials and by filling voids in the cement with tightly packed crystals of calcium carbonate. Consequently, the strength is greater than is possible when using alkali-tolerant, coated glass or the relatively weaker, alkali-tolerant plastics.

The present invention therefore uses cement which has been carbonated to convert its pH to neutral (7) as a binder for glass and/or certain plastic, naturally occurring aggregates, fibers, cloth and/or roving as a substitute for alkali-resistant glass and plastics; for example, to make such products as fiberglass reinforced cement board and many others.

Thus, it is an object of the present invention to use supercritical $CO_2$ to densify and simplify the matrices of hardened hydraulic cement pastes, including cement pastes formulated completely or in part with portland cement, self-cementing or alkali-activated fly-ash pozzolans, natural pozzolans, alkali-activated or self-cementing slags or lime and possibly containing other additives, reinforcements or aggregates.

It is a further purpose of this invention to use supercritical $CO_2$ to determine if a hardened hydraulic cement will resist carbonation.

A still further purpose of this invention is to use supercritical $CO_2$ (which in accordance with the earlier definition of this term now excludes dense-phase $CO_2$) to transport dissolved or certain suspended organic and/or inorganic materials into the pores and capillaries of hardened and fully hydrated cement matrices to thereby alter physical and/or chemical properties and the behavior of cement matrices.

Another purpose of this invention is to utilize supercritical $CO_2$ to carbonate ceramic or hardened hydraulic cement matrices, reducing alkalinity to approximately pH 7, while simultaneously densifying and simplifying the morphology of the microstructure and infusing other materials dissolved, and under certain circumstances suspended in the $CO_2$.

An additional purpose of this invention is to use supercritical $CO_2$ to infuse conductive materials into cement matrices to alter the electrical properties and behavior of the latter.

It is a further purpose of this invention to use supercritical $CO_2$ to infuse materials into cement matrices which, at conditions of elevated temperatures, will melt or otherwise fuse or combine with the materials and structures of the cement matrix to impart altered physical, electrical or mechanical properties, or other desirable behavior and properties.

It is a still further object of this invention to use supercritical $CO_2$ to infuse hardened hydraulic cement matrices with dissolved substances that will react when subsequently exposed to certain chemicals and solvents.

Another objective of this invention is to use supercritical $CO_2$ to infuse the matrices with substances that will prevent disruptive reaction resulting from subsequent exposure to chemicals and solvents.

DESCRIPTION OF THE PREFERRED EMBODIMENTS

This invention contemplates to employ manufacturing processes similar to those currently utilized to produce products shaped of rigid thermoplastics, metals or ceramics. These processes include the molding of articles, their extrusion and pultrusion, as well as casting, sintering, machining or forging, as is discussed in more detail below.

Molded products, particularly rigid thermoplastics and ceramics, are formed in numerous ways. Among these are injection molding and rotational molding, which have the common characteristic that a plastic material is forced into a mold made of one or more parts in the shape of the desired finished product. Once the material is placed in the mold, it is allowed or caused to harden and the mold is then opened to release the finished article. In accordance with the present invention, hydraulic cement is forced into the mold. For purposes of this specification, "hydraulic cement" is meant to and does include any or all of a mixture of portland, pozzolan or lime, and such cement may include additives to provide increased strength, color, hardening speed or other desired characteristics. These additives may further include such materials as fibrous reinforcements, aggregates, catalytic chemicals or plasticizers.

Another means of forming plastics and metals into products is by extrusion, in which the plastic material is forced through an orifice that gives rise to the shape of the finished product, or by pultrusion, in which the plastic material is drawn or pulled, rather than pushed, through a forming orifice.

In casting processes, a liquefied material is simply poured into a mold where it cures or hardens into a product having the shape of the mold and from which it is later removed by parting the mold. This technique is commonly used to form ceramics and metals. Metals may also be beaten into shape in the forging process.

Finally, plastics, metals and some ceramics may be machined into their final forms using rotary lathes and milling devices.

All of these techniques are suitable for forming products from materials made in accordance with the present invention.

A typical process in accordance with this invention therefore involves giving the material its final shape in the manner described above, or, if it is later to be machined, giving it roughly the shape of the final product. Once the cement has hardened, one of two alternative embodiments of this invention can be selected. The first embodiment simply alters the hardened matrix by infusing it with supercritical $CO_2$, a dense gaseous-liquid phase of $CO_2$. The supercritical $CO_2$ infusion may take place above or below the supercritical threshold temperature (31° C.) of $CO_2$ so long as the $CO_2$ initially reached or exceeded the supercritical temperature threshold. And in one embodiment of the invention, it takes place over a temperature range of between 2° and 31° C.

The supercritical $CO_2$ infusion causes the hydroxides in the cement to convert to carbonates. It also alters the physical micro-structure of the material, simplifying, compacting and closely organizing what once was the calcium-silicate-hydrate phase into uniform, onyx-like grains with few pores and capillaries visible between them, even when viewed at a magnification of 10,000. The flat plates and needles in the crystal mass that would otherwise appear are entirely or very nearly absent.

Supercritical $CO_2$ at a pressure of approximately 100 atmospheres and a temperature ranging between 2° and 10° C. seems to produce the most uniform and evenly packed microstructure. The porosity and size of the material governs the amount of time required for complete infusion and carbonation to take place. More porous or cellular materials are infused and carbonated more rapidly than those that are denser. Table 1 shows times and pressures for a variety of cements of varying densities to attain complete carbonation. The tests were conducted on samples which had a uniform thickness of about 2 cm.

TABLE 1

Typical CO2 Cement Carbonation Parameters

| Cement type | Density pounds per cubic foot | Pressure pounds/ square inch | Temperature in degrees Celsius | Duration in minutes |
|---|---|---|---|---|
| portland | 20 | 990 | 8 | 15 |
|  | 50 | 1071 | 31 | 60 |
|  | 110 | 2055 | 26 | 60 |
|  | 180 | 3350 | 22 | 60 |
| type-C fly ash | 20 | 990 | 8 | 15 |
|  | 50 | 1071 | 28 | 60 |
|  | 110 | 1900 | 28 | 60 |
|  | 180 | 2300 | 32 | 60 |

The second embodiment of the present invention is similar to the first, except that the supercritical carbon dioxide (but not dense-phase $CO_2$), in addition to reacting with the hydroxides in the cement, acts as a transport medium or solvent to carry other dissolved or suspended (particulate) matter into a hardened hydraulic cement matrix. In this embodiment, the carbonation reaction occurs as above described, but it is part of a larger chemical and physical process. For example, zinc oxide or finely powdered (pulverulent) metallic zinc can be dissolved or suspended (as powder particles) in the supercritical $CO_2$ and be infused into the cement matrix to form such reaction products as hemimorphite and smithsonite. This reaction, only one of many possible, closes the capillaries and fills the micropores with reaction products. As a result, the cement matrix is rendered less permeable; for example, by water. The zinc infusion also increases the ductility of the cement.

To accomplish such an infusion of materials which are dissolvable or suspendable in supercritical $CO_2$, the supercritical $CO_2$ is first passed through a chamber containing the material and is then flowed into a chamber containing the hardened cement article. Materials which dissolve in $CO_2$ go into solution with it as the $CO_2$ passes through the chamber. Materials not dissolvable in $CO_2$ shall have been first pulverized into sufficiently small powder particles that they can flow with the supercritical $CO_2$ through the pores and capillaries of the cement matrix. They are appropriately mixed with; i.e. suspended in, the supercritical $CO_2$ before the cement matrix is exposed to it so that the entrained powder particles flow with the $CO_2$ through the pores and capillaries into the interior of the cement matrix.

In another embodiment of the invention the cement matrix is infused and carbonated with a plastic dissolved in the supercritical $CO_2$. This process is carried out as described in the preceding paragraph, except that the first chamber contains the plastic. Plastics used in this process are selected on a case-by-case basis and may include any one of the class of monomers, polymers or copolymers soluble in supercritical $CO_2$. Mixtures of plastics, metals, and/or metal salts and plastics and mixtures of metals and or metal salts may be infused, depending upon the final characteristics desired of the carbonated cement matrix.

By infusing metal into the cured cement matrix, it is also possible to change the electrical properties of the latter. For example, a desirable metal such as aluminum or copper can be pulverized to a powder particle size which is sufficiently small so that the particles can pass through pores and capillaries into and through the matrix. The metal powder is entrained in supercritical $CO_2$, the cement matrix is exposed to the $CO_2$-metal powder mixture, and the $CO_2$ carries the powder particles with it into the cured cement matrix, where the powder particles are deposited. By heating the matrix above the melting temperature of the powdered metal, the latter is melted and forms interconnected electrically conductive layers on interior surfaces of the pores, voids, passages and capillaries of the cement matrix, thereby rendering the interior of the matrix electrically conductive.

According to another embodiment of the invention, the supercritical carbon dioxide carbonation/infusion process can be used to quickly determine whether or not a cement matrix will carbonate at all. This is important in the construction industry, which relies upon cement alkalinity to protect steel reinforcing rod and mesh from corrosion. When added to cement pastes during the mixing process, hydroxypropyl methyl cellulose, an organic polymer, will prevent cement carbonation from taking place, and it is believed that there are other such materials which can be added to the wet cement mix. Until now it has not been possible to quickly determine whether or not such a material is present in the mix and whether or not the cement would, in fact, carbonate when exposed to naturally occurring $CO_2$ in the atmosphere, low-pressure $CO_2$ or supercritical $CO_2$. Infusion with supercritical $CO_2$ followed by either X-ray diffraction spectrometry or by exposing a small specimen of the matrix to phenolphthalein will quickly ascertain the extent, if any, to which the matrix of the specimen has carbonated. This provides a simple, fast test to determine if a material or materials have been added to the cement which will prevent carbonation of the cement matrix.

The range of articles and materials that may be created by means of supercritical $CO_2$ carbonation/infusion is quite broad. It includes many articles now made of opaque, rigid thermoplastics, metal or ceramics. It is expected that articles may be formed that are useful to the aerospace, automotive, manufacturing, construction, medical and petrochemical production industries. Because hardness, ductility, coefficient of expansion, electrical properties and many other factors may be controlled with this process, it is expected that items such as consumer goods, engine parts and even prosthetics can be manufactured from the class of materials made in accordance with the present invention.

Thus, the present invention makes possible cement products with characteristics which heretofore were unattainable, not only because of the severe limitations of the type and characteristics of fiber reinforcements and/or aggregates that could be mixed into the cement, but further because the present invention enables one to infuse materials into the cured cement which affect its chemical and/or physical properties. With carbonation and resultant pH neutralization, almost any fiber and/or aggregate can be mixed with the cement since the danger of decomposition of the reinforcing fibers is eliminated. Fibers such as glass can therefore be selected for their high tensile strength and others for flexibility (such as polyester) and they can be combined or blended to give the finished cement product characteristics combining a variety of properties. In addition, heretofore unattainable characteristics, such as internal electric conductivity of the cement matrix, are attainable with the present invention to further expand the uses of cement products. Since, moreover, cement products are relatively easy to initially form; e.g. by pouring the wet cement mixture into molds, new types of products at significantly reduced cost will become available.

What is claimed is:

1. A method of improving a cured cement product comprising the steps of mixing at least cement and water to form a mixture, curing the mixture, and subjecting the mixture to supercritical $CO_2$.

2. A method according to claim 1 wherein the step of subjecting the mixture to supercritical $CO_2$ is performed after the step of curing has been initiated.

3. A method according to claim 2 wherein the step of subjecting is at least in part performed after the step of curing has been substantially completed.

4. A method according to claim 1 including the step of generating supercritical $CO_2$ by raising the pressure of the $CO_2$ to at least 1071 psi and simultaneously bringing the temperature of the $CO_2$ to at least 31° C.

5. A method according to claim 1 including the step of further treating the mixture with $CO_2$ at a pressure of more than 1071 psi and at a temperature below about 31° C. after the step of subjecting the mixture to supercritical $CO_2$.

6. A method according to claim 5 wherein the temperature of the $CO_2$ is in the range of between about 2° C. and no more than 31° C.

7. A method according to claim 1 including the step of entraining in the supercritical $CO_2$ a third material, and conducting the step of subjecting the mixture to supercritical $CO_2$ thereafter to thereby infuse the supercritical $CO_2$ bearing the third material into the mixture.

8. A method according to claim 7 wherein the third material comprises a substance which is soluble in $CO_2$, and including the step of dissolving the third material in the supercritical $CO_2$ prior to the subjecting step.

9. A method according to claim 7 wherein the third material is insoluble in the $CO_2$ and comprises a powder composed of powder particles of a size sufficiently small so that the particles can be transported with the supercritical $CO_2$ through pores and capillaries forming passages in the mixture.

10. A method according to claim 9 wherein the third material is a metal.

11. A method according to claim 10 including the step of heating the cured mixture and the infused particles to at least about a melting temperature of the metal to thereby provide the cured mixture with a modified electrical conductivity.

12. A method according to claim 1 including the step of testing the cured mixture subsequent to the subjecting step to determine if the supercritical $CO_2$ penetrated into an interior of the cured mixture to thereby determine if the cured mixture includes an additive preventing the supercritical $CO_2$ from penetrating the cured mixture.

13. A method of protecting alkali-intolerant matter in a cured cement product and changing characteristics of the cement product after curing comprising the steps of mixing cement, water and the matter to form a mixture, curing the mixture, providing supercritical $CO_2$, adding a material to the supercritical $CO_2$ to form a supercritical admixture, the material being in a form in which it can enter the cement product through pores and capillaries therein, subjecting the cement product to the admixture to thereby lower the pH of the cement product and infuse into the cement product the material, withdrawing at least some of the supercritical $CO_2$ from the cement product, and leaving at least some of the material in the cement product to thereby change at least one of a chemical and a physical characteristic of the product with the material.

14. A method according to claim 13 wherein the step of adding comprises the step of dissolving the material in the supercritical $CO_2$.

15. A method according to claim 13 wherein the step of adding comprises the step of suspending the material in the supercritical $CO_2$.

16. A method according to claim 15 including the step of pulverizing the material prior to the subjecting step.

17. A method according to claim 13 wherein the step of subjecting the cement product to the admixture comprises reducing the pH of the cement product to about 7.

18. A method of changing a characteristic of a cured cement product comprising the steps of forming the product from a wet cement mix including at least cement and water, providing supercritical $CO_2$, adding a material to the supercritical $CO_2$ to form a supercritical mixture, the material being in a form in which it can enter the cement product through pores and capillaries therein, flowing the admixture into the cement product, and depositing at least some of the material on an interior of the cement product, whereby the deposited material changes a characteristic of the cement product.

19. A method according to claim 18 wherein the material comprises pulverized metal particles entrained in the supercritical $CO_2$.

20. A method according to claim 19 including the step of heating the cement product to a sufficient temperature to fuse at least some of the metal particles to each other and thereby change electrical conductivity of the product.

* * * * *

UNITED STATES PATENT AND TRADEMARK OFFICE
CERTIFICATE OF CORRECTION

PATENT NO. : 5,518,540

DATED : May 21, 1996

INVENTOR(S) : Roger H. Jones, Jr.

It is certified that error appears in the above-identified patent and that said Letters Patent is hereby corrected as shown below:

Column 1, line 34, the equation should be corrected so the third "$_2$" is a --$_3$--.

The correct equation is: $Ca(OH)_2 + CO_2 \rightarrow CaCO_3 + H_2O$

Signed and Sealed this

Thirteenth Day of August, 1996

Attest:

BRUCE LEHMAN

*Attesting Officer*   *Commissioner of Patents and Trademarks*